United States Patent [19]

Tomida et al.

[11] Patent Number: 4,965,609

[45] Date of Patent: Oct. 23, 1990

[54] JET RECORDING METHOD USING INK WITH VISCOSITY OF AT LEAST 2CP WHICH IS HEATED TO LOWER THE VISCOSITY THEREOF TO BELOW 2CP BEFORE JETTING

[75] Inventors: Yasuko Tomida, Atsugi; Shoji Koike, Yokohama, both of Japan

[73] Assignee: Canon Kabushiki Kaisha, Tokyo, Japan

[21] Appl. No.: 352,628

[22] Filed: May 15, 1989

Related U.S. Application Data

[63] Continuation of Ser. No. 273,728, Nov. 18, 1988, abandoned, which is a continuation of Ser. No. 63,394, Jun. 18, 1987, abandoned.

[30] Foreign Application Priority Data

Jun. 20, 1986 [JP] Japan .................... 61-145617

[51] Int. Cl.$^5$ .................................................. B41J 2/05
[52] U.S. Cl. ........................................ 346/1.1; 106/22; 346/140 R
[58] Field of Search ............... 346/1.1, 140; 106/22, 106/20

[56] References Cited

U.S. PATENT DOCUMENTS

| | | | |
|---|---|---|---|
| 4,243,994 | 1/1981 | Kobayashi | 346/140 |
| 4,279,653 | 7/1981 | Makishima et al. | |
| 4,296,421 | 10/1981 | Hara | |
| 4,352,114 | 9/1982 | Kyoguku | |
| 4,352,691 | 10/1982 | Owatari | |
| 4,380,771 | 4/1983 | Takatori | |
| 4,391,639 | 7/1983 | Kobayashi | 106/22 |
| 4,399,443 | 8/1983 | Yasufuru | 346/1.1 |
| 4,492,966 | 1/1985 | Seki | |
| 4,544,931 | 10/1985 | Watanabe | |
| 4,636,410 | 1/1987 | Akiya | 346/1.1 X |
| 4,660,056 | 4/1987 | Yokoi | |
| 4,712,172 | 12/1987 | Kiyohara | 346/1.1 |
| 4,719,472 | 1/1988 | Arakawa | 346/140 |

FOREIGN PATENT DOCUMENTS

| | | |
|---|---|---|
| 0085869A3 | 8/1983 | European Pat. Off. |
| 2333844 | 1/1977 | France |
| 29546 | 3/1980 | Japan |
| 49762 | 3/1983 | Japan |
| 2070049A | 9/1981 | United Kingdom |

OTHER PUBLICATIONS

Patent Abstracts of Japan, vol. 7, No. 135 (C-170)[1280], Jun. 11, 1983; JP-A-58 49 762 (Fujitsu K.K.) 24-03-83.

*Primary Examiner*—Joseph W. Hartary
*Attorney, Agent, or Firm*—Fitzpatrick, Cella, Harper & Scinto

[57] ABSTRACT

There is disclosed an ink jet recording method which performs recording by attaching liquid droplets of a recording liquid onto a recording medium, wherein recording is performed by elevating the temperature of the recording liquid having the viscosity of 2 centipoise or higher and the surface tension of 40 dyne/cm or higher at 25° C. to form recording liquid droplets having the viscosity less than 2 centipoise.

23 Claims, No Drawings

4,965,609

JET RECORDING METHOD USING INK WITH VISCOSITY OF AT LEAST 2CP WHICH IS HEATED TO LOWER THE VISCOSITY THEREOF TO BELOW 2CP BEFORE JETTING

This application is a continuation of application Ser. No. 273,728, filed Nov. 18, 1988, which is a continuation of application Ser. No. 063,394, filed June 18, 1987, now abandoned.

BACKGROUND OF THE INVENTION

1. Field of the Invention

This invention relates to an ink jet recording method which performs recording on designated paper specially prepared for ink jet recording, and also on paper generally used in offices or homes such as copying paper, report paper, bond paper, continuous slip paper, etc., and various cloths with rapid fixing, with high optical density and little feathering.

2. Related Background Art

There have been made so many proposals about the ink jet recording method of the prior art, and in which the method for performing recording by use of a recording liquid (also called ink) containing a dye dissolved in water or a water-soluble organic solvent as main components has been the leading method.

In recording methods which use such ink, although the requisite items may differ slightly depending on the difference in individual system, the items commonly demanded which are particularly important are as follows:

(1) recorded images with good quality and high optical density without feathering should be obtained;

(2) fixing speed of ink should be rapid;

(3) durability of printed matter as regarding water resistance, lightfastness, etc., should be excellent;

(4) ink should not clog in the nozzle and in the ink passage way;

(5) stable ejection of ink should be obtained over a long term;

(6) no change of ink should occur even during long term storage, etc.

For satisfying some or all of the above objects, investigations have been aggressively made in both aspects of ink and device. However, even when ink jet printer systems which are commercially available are examined, there is no ink jet recording method yet which has satisfied the above objects sufficiently under the present circumstance. For example, when a minimally volatile polyalkylene glycol or glycerin for the prevention of clogging is added sufficiently to the mixture of a dye and water, the ink has poor penetration in normal paper with effective sizing because of the increased viscosity thereof, whereby several minutes may be required for fixing, thus posing a problem in practical application, although no clogging may occur.

For overcoming this problem, Unexamined Japanese Laid-Open Patent Publication No. 29546/1980 proposes to add a surfactant. In such a case, although improvement of fixing speed may be effected to a satisfactory extent depending on the kind or amount of the surfactant added, feathering becomes greater due to the lowering of the surface tension of the ink, whereby printing quality is lowered to great extent.

On the other hand, when a strongly basic substance is added in the ink as in Unexamined Japanese Patent Publication No. 57862/1981 in place of a surfactant, this substance destroys an internal sizing agent in the paper, typically rosin, and therefore fixing speed is rapid and printed letters with little feathering can be obtained. However, in the neutral paper, due to differences in the sizing agent, there is substantially no effect and of course the high pH substance is dangerous when used in the home or office.

Also, in Unexamined Japanese Patent Publication No. 49762/1983, there has been proposed the method in which recording is performed by defining the dynamic viscosity of ink from 4 to 8 cps at 35° C., and maintaining the ink with a water content of ¼ or less at 30° C. or higher. According to this method, although satisfactory results can be obtained to some extent with respect to clogging and maintenance of stable high speed recording, problems will ensue particularly with respect to fixing characteristics and feathering on normal paper, because the solvents content in the ink is so high.

SUMMARY OF THE INVENTION

The present invention solves all of the problems mentioned above.

Also, for improvement of printing quality, it may be conceivable to densify printed matter by increasing the dye concentration in the ink, but, in this case, there ensues the problem that clogging of orifice is liable to increase the dye with concentration.

That is, an object of the present invention is to provide an ink jet recording method in which fixing speed is rapid and printed letters with little feathering can be obtained not only on designated paper prepared especially for ink jet recording, but also on other normal papers which are subjected to sizing and have fibers exposed on the surface to be recorded, e.g. copying paper, report paper, bond paper, continuous slip paper and the like.

It is also another object of the present invention to provide an ink jet recording method, which records with high optical density possible, by use of an ink which is safe and does not cause clogging.

The above objects can be accomplished by the present invention as specified below.

According to one aspect of the present invention, there is provided an ink jet recording method which performs recording by attaching liquid droplets of a recording liquid onto the recording medium, wherein recording is performed by elevating the temperature of the recording liquid having the viscosity at 25° C. of 2 centipoise or higher and a surface tension of 40 dyn/cm or higher so as to form recording liquid droplets having a viscosity less than 2 centipoise.

According to a further aspect of the present invention, there is provided an ink jet recording method which performs recording by attaching liquid droplets of a recording liquid onto a recording medium, wherein recording is performed by elevating the temperature of a recording liquid having both a viscosity of 2 centipoise or higher and a surface tension of 40 dyne/cm or higher at 25° C. and containing 50 wt. % or more water to form recording liquid droplets having a viscosity of less than 2 centipoise.

According to another aspect of the present invention, there is provided an ink jet recording method which performs recording by attaching liquid droplets of a recording liquid onto a recording medium, wherein recording is performed by elevating the temperature of a recording liquid having both a viscosity of 2 centipoise or higher and a surface tension of 40 dyne/cm or higher at 25° C. to form recording liquid droplets having a viscosity of less than 2 centipoise and attaching such liquid droplets onto the surface of a recording medium which was subjected to sizing and has fibers exposed thereon.

DETAILED DESCRIPTION OF THE PREFERRED EMBODIMENTS

The present invention have found that, among various requirements as described above in the ink jet recording technique, particularly both good printing quality without feathering and rapid fixing can be satisfied by controlling the viscosity and the surface tension of the ink to certain specific values.

More specifically, it has been found that both printing quality and fixing characteristics can be satisfied by defining the physical property values of the ink (for performing printing on normal papers which are subjected to sizing and have fibers exposed on the surface to be recorded) as the viscosity less than 2 centipoise at 25° C., and as the surface tension of 40 dyn/cm or more, preferably 70 dyn/cm or less.

When the viscosity of the ink upon printing exceeds 2 centipoise, fixing characteristic is insufficient, particularly in a recording medium with high degree of sizing. On the other hand, when the surface tension of the ink is smaller than 40 dyn/cm, feathering is liable to be generated, and lowered printing quality by feathering is particularly marked in a recording medium with low degree of sizing.

For the method for setting the physical property values of the ink during printing within the ranges as specified above, namely at a viscosity less than 2 centipoise and a surface tension of 40 dyn/cm or more, it is effective to increase the water content and reduce the amount of solvent used the ink as much as possible, and to select the solvent those used from those having lower viscosities, namely, those having generally higher vapor pressures.

However, in the recording method by use of such ink, evaporation of the ink solvent is great, whereby clogging at the nozzles, etc., of the printer is generated to pose a problem with respect to reliability.

Accordingly, in the present invention, to solve first the problem of clogging which is the essential requisite item in the ink jet recording method, as the first specific feature, an ink with a viscosity at 25° C. of 2 centipoise or higher and a surface tension of 40 dyn/cm or higher is to be used.

For prevention of clogging, it is beneficial to increase the amount of the solvent or to use a low vapor pressure solvent. More specifically, when ink is formulated from an aqueous solution of a water-soluble acidic dye, direct dye or a dye for food, the amount of the solvent to be used in view of the solubility of the dye may be, for example, about 26 parts by weight for diethylene glycol (frequently used in the ink for ink jet recording,) about 20 parts by weight for triethylene glycol, and about 14 parts by weight for polyethylene glycol (average molecular weight 300) as a least essential amount, and the viscosity of the ink in these cases becomes about 2 centipoise.

In the ink thus prepared, no clogging is generated, whereby reliability becomes good.

However, since the viscosity of the ink exceeds 2 centipoise, fixing characteristics become insufficient as described above, so that there is the problem in fixing characteristic on a recording medium with high degree of sizing.

Thus, the present invention has been accomplished as the result of intensive studies about the method satisfying simultaneously the requisite items which are antagonistic to each other in ink design, namely the item of "generation of no clogging" and the item of "obtaining good printing quality with rapid fixing speed and without feathering".

That is, the ink jet recording method capable of satisfying simultaneously clogging and fixing characteristic and printing quality has been accomplished by the method of performing recording by elevating the temperature of the ink with the viscosity at 25° C. of 2 centipoise or more to make the viscosity less than 2 centipoise, preferably less than 1.8 centipoise, which is the second primary specific feature of the present invention.

It has been well-known in the art that the viscosity of ink is lowered by elevation in temperature. Surface tension also tends to be lowered with temperature elevation. Accordingly, with respect to this point, the changes surface tension changes which occur not preferable for printing quality, but as compared with the abrupt viscosity change by temperature, influence on the printing quality by surface tension change is small, and the object of the present invention can be sufficiently accomplished with an ink having a surface tension of 40 dyn/cm or more at 25° C.

Also, by lowering in ink viscosity accompanied by ink temperature elevation during recording, generally the ejected amount of ink is increased and the ink spread area on the recording medium becomes larger, and therefore the recording method practiced with temperature elevation of ink is also effective for increasing the optical density of the printed matter. In this case, since the dye concentration in ink is not particularly required to be increased, the optical density can be intensified without accompaniment of the problem of clogging.

Such intensification of the optical density of printed matter is further increased when special recording paper for ink jet recording or various cloths are used as the recording medium.

When the increase in the amount of ejected ink is a problem, for example, when the ejected amount is remarkably increased due to viscosity lowering on normal paper with high degree of sizing, and when the ejected amount of the ink is remarkably greater than the ink absorption capability to generate overflowing, it is possible to cope with such problem by lowering in driving voltage or driving frequency and change in printing pattern, etc.

Next, the constitution of the present invention is described in more detail.

The ink jet recording system to be used in the present invention may be any system which permits ink to be released effectively from a nozzle and imparts the ink to the recording medium target, typical examples of which are described in IEEE Transactions on Industry Applications Vol. JA-13, No. 1 (Feb., Mar., 1977); Nikkei Electronics, Apr. 19, 1976, Jan. 29, 1973 and May 6, 1974. The methods described in these references may include, firstly the electrostatic attracting system, and secondly the system in which fine ink particles are ejected forcibly by applying high pressure on ink by a small pump and vibrating mechanically the nozzle by quartz oscillator, etc. As another type of the second system, there is the system called the microdot ink jet system. Also, as the third system, there is the system in which ink is ejected from a nozzle by applying pressure to the ink by giving electrical signals to a piezoelectric element to generate mechanical displacement. Further, it is possible to use effectively the ink jet system as disclosed in Unexamined Japanese Patent Publication No. 59936/1979, in which the ink receiving the action of heat energy is abruptly changed in volume, and is ejected from the nozzle by the active force through this change in state.

The above systems are specific examples of preferable recording methods in the present invention. Accordingly, the present invention is not limited to these, but it is also applicable for other ink jet recording methods than those as mentioned above.

Next, the constitution of the ink ejected by various system as described above is to be explained.

The dye itself to be used in the ink according to the present invention may be known per se, and for example, insoluble dyes such as pigments or disperse dyes can be also used, but preferably dyes are water-soluble dyes such as direct dyes, acidic dyes, basic dyes, reactive dyes, dyes for foods, etc. Particularly, those dyes which are suitable as the ink for ink jet recording system satisfy performances such as color forming property, sharpness, stability, lightfastness and others may include: direct dyes such as C.I. Direct Black 17, 19, 32, 51, 62, 71, 108, 146, 154;
C.I. Direct Blue 6, 22, 25, 71, 86, 90, 106, 199;
C.I. Direct Red 1, 4, 17, 28, 83;
C.I. Direct Yellow 12, 24, 26, 44, 86, 98, 100, 142;
C.I. Direct Orange 34, 39, 44, 46, 60;
C.I. Direct Violet 47, 48;
C.I. Direct Brown 109;
C.I. Direct Green 59, etc.;

acidic dyes such as
Acid Black 2, 7, 24, 26, 31, 52, 63, 112, 118;
C.I. Acid Blue 9, 22, 40, 59, 93, 102, 104, 113, 117, 120, 167, 229, 234, 254;
C.I. Acid Red 1, 6, 8, 32, 37, 51, 52, 80, 85, 87, 92, 94, 115, 180, 256, 317, 315;
C.I. Acid Yellow 11, 17, 23, 25, 29, 42, 49, 61, 71;
C.I. Acid Orange 7, 19;
C.I. Acid Violet 49, etc., reactive dyes such as
C.I. Reactive Yellow 2, 3, 13, 15, 17, 18, 23, 24, 37, 42, 57, 58, 64, 75, 76, 77, 79, 81, 84, 85, 87, 88, 91, 92, 93, 95, 102, 111, 115, 116, 130, 131, 132, 133, 135, 136, 137, 139, 140, 142, 143, 144, 145, 146, 147, 148, 151, 162, 163;
C.I. Reactive Orange 5, 7, 11, 12, 13, 15, 16, 35, 45, 46, 56, 62, 70, 72, 74, 82, 84, 87, 91, 92, 93, 95, 97, 99;
C.I. Reactive Red 3, 13, 16, 21, 22, 23, 24, 29, 31, 33, 35, 45, 49, 55, 63, 85, 106, 109, 111, 112, 113, 114, 118, 126, 128, 130, 131, 141, 151, 170, 171, 174, 176, 177, 183, 184, 186, 187, 188, 190, 193, 194, 195, 196, 200, 201, 202, 204, 206, 218, 221;
C.I. Reactive Violet 1, 4, 5, 6, 22, 24, 33, 36, 38;
C.I. Reactive Blue 2, 3, 5, 8, 10, 13, 14, 15, 18, 19, 21, 25, 27, 28, 38, 39, 40, 41, 49, 52, 63, 71, 72, 74, 75, 77, 78, 79, 89, 100, 101, 104, 105, 119, 122, 147, 158, 160, 162, 166, 169, 170, 171, 172, 173, 174, 176, 179, 184, 190, 191, 194, 195, 198, 204, 211, 216, 217;
C.I. Reactive Green 5, 8, 12, 15, 19, 23;
C.I. Reactive Brown 2, 7, 8, 9, 11, 16, 17, 18, 21, 24, 26, 31, 32, 33;
C.I. Reactive Brown 1, 5, 8, 13, 14, 23, 31, 34, 39, etc., and otherwise C.I. Basic Black 2;
C.I. Basic Blue 1, 3, 5, 7, 9, 24, 25, 26, 28, 29;
C.I. Basic Red 1, 2, 9, 12, 13, 14, 37;
C.I. Basic Violet 7, 14, 27;
C.I. Food Black 1, 2.

The above examples of dyes are particularly preferable for the ink to be used in the present invention, however the dyes to be used for the ink of the present invention are not limited thereto.

Such dye may be used generally at a ratio of about 0.5 to 30 wt. % in the ink, preferably 1 to 25 wt. %, more preferably 1 to 10 wt. %.

The solvent used in the ink to be used in the present invention is water or a solvent mixture of water with a water-soluble organic solvent, more preferably a solvent mixture of water with a water-soluble organic solvent which contains a polyhydric alcohol having the drying-preventing effect. Also, as the water, it is preferable to use deionized water rather than water in general containing various ions.

Examples of the water-soluble organic solvent to be used mixed with water may include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc., ketone or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols with alkylene group containing 2 to 6 carbon atoms such as ethylene glycol, propylene glycol, butylene glycol, triethylene glycol, 1,2,6-hexane triol, thiodiglycol, hexylene glycol, diethylene glycol, etc.; glycerin; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, triethanolamine, sulforane, etc. Among these many water-soluble organic solvents, polyhydric alcohols such as diethylene glycol, etc., lower alkyl ethers of polyhydric alcohols such as triethylene glycol monomethyl (or ethyl) ether, etc., are preferred.

The content of the above water-soluble organic solvent in the ink may be generally 2 to 50 wt. % based on the total weight of the ink, preferably 5 to 40 wt. %, more preferably 10 to 30 wt. %.

The content of water in the ink, particularly in view of fixing characteristic on normal paper and feathering of dots, may be 50 wt. % or more, preferably 60 wt. % or more, more preferably 70 wt. % or more.

The essential components in the ink composition in the present invention are as described above. Various other dispersing agents, surfactants, viscosity controllers, surface tension controllers, fluorescence brighteners, etc., known in the art can also be added if necessary.

For example, there may be included viscosity controllers such as polyvinyl alcohol, celluloses, water-soluble resins, etc.; various surfactants such as cationic, anionic, or nonionic surfactants; surface tension controllers such as diethanolamine, triethanolamine, etc.; pH controllers with buffer solution; antifungal agent, etc.

Also, for making up the ink to be used in the ink jet recording method of the type which charges ink, specific resistance controllers of inorganic salt, etc., such as lithium chloride, ammonium chloride, sodium chloride may be added. When applied for the ink jet system of the type in which ink is ejected through the action of heat energy, thermal physical property values (e.g. specific heat, coefficient of thermal expansion, thermal conductivity, etc.) may be sometimes controlled.

The ink to be used in the present invention basically comprises the above components, and the present invention is characterized in that the recording is preformed by use of such recording ink in to the ink jet recording systems, described above, by allowing a ink with the viscosity at 25° C. of 2 centipoise or higher and the surface tension of 40 dyn/cm or higher to be used as an ink with a viscosity less than 2 centipoise, preferably less than 1.8 centipoise by temperature elevation.

For satisfying the above conditions, the ink to be used in the present invention should be desirably controlled to the viscosity at 25° C. of 15 centipoise or lower, preferably 10 centipoise or lower, more preferably 5 centipoise or lower.

According to such ink jet recording method of the present invention, on papers used in office and various cloths, etc., (other than the papers for ink jet recording) on which only poor images could be formed due to feathering during printing, images of high quality and high optical density without feathering can be formed, and the recording method having remarkably excellent in drying and fixing characteristics can be realized.

Accordingly, in the present invention, since not only designated paper specially prepared for ink jet recording, but also papers widely utilized in office or home such as copying paper, report paper, bond paper, slit paper, etc., can be sufficiently utilized as the recording medium for the ink jet recording system, it becomes possible to accelerate the further applications of the ink jet recording system.

Also, it becomes possible to obtain a recording method having excellent reliability not only in ejecting stability, storage stability, frequency response of ink as a matter of course, but also in respect of clogging of ink at nozzles, etc., which is particularly deemed to be important in ink jet recording.

Further, since a basic substance, etc., is not required, a recording method which is extremely for use in the home or office can be realized.

As the temperature elevation method of the ink in the present invention, any means may be employed. For example, temperature elevation can be freely made according to, e.g., a method of providing a resistant heating generating element capable of controlling the amount of heat generation electrically in the ink liquid chamber in the vicinity of nozzles. Further, the control of ink temperature is also possible by employment of a temperature sensor such as a thermistor, etc., in the ink liquid chamber, and the temperature control for setting to a desired viscosity can be freely effected.

In the present invention, temperature elevation may be effected to a temperature of about 30° C. to 80° C., which may differ depending on the ink employed.

The values of viscosity and surface tension in the specification were obtained by the measuring instruments shown below.
. Viscosity: VISCONIC ELD, produced by Tokyo Keiki
. Surface tension: Kyowa CBVP SURFACE TENSIOMETER A-1, produced by Kyowa Kagaku The present invention is described in more detail by referring to the following Reference examples, Examples and Comparative examples. In the sentences, parts and % are based on weight, unless otherwise particularly noted.

REFERENCE EXAMPLES

Preparation of inks A–G

After the following components were stirred for 5 hours, each mixture was controlled to pH 7.5 with 0.1% aqueous sodium hydroxide solution, and further subjected to filtration under pressurization through a membrane filter (trade name: Fluoropore Filter, produced by Sumitomo Denko) with a pore size of 0.45 micron to prepare inks of the present invention.

| Ink A | |
|---|---|
| C.I. Food Black 2 | 5 parts |
| Glycerine | 20 parts |
| Water | 75 parts |
| Ink B | |
| C.I. Food Black 2 | 5 parts |
| Diethylene glycol | 10 parts |
| Triethylene gycol | 10 parts |
| Nonionic surfactant (trade name: Emulgen PP150, produced by Kao K.K.) | 0.2 parts |
| Water | 75 parts |
| Ink C | |
| C.I. Direct Black 154 | 5 parts |
| Triethylene glycol | 2 parts |
| Water | 70 parts |
| Ink D | |
| C.I. Direct Black 154 | 5 parts |
| Diethylene glycol | 25 parts |
| Polyethylene glycol (average molecular weight 300) | 10 parts |
| Nonionic surfactant (trade name: Emulgen PP150, produced by Kao K.K.) | 0.2 parts |
| Water | 60 parts |
| Ink E | |
| C.I. Food Black 2 | 5 parts |
| Ethylene glycol | 10 parts |
| Water | 85 parts |
| Ink F | |
| C.I. Food Black 2 | 5 parts |
| Diethylene glycol | 20 parts |
| Nonionic surfactant (trade name: Emulgen PP150, produced by Kao K.K.) | 0.4 parts |
| Water | 75 parts |
| Ink G | |
| C.I. Direct Black 154 | 5 parts |
| Triethylene glycol | 13 parts |
| Nonionic surfactant (trade name: Emulgen PP150, produced by Kao K.K.) | 0.4 parts |
| Water | 82 parts |

Examples 1 to 5 and Comparative examples 1 to 6

By use of the Inks A–G obtained, and by use of an ink jet recording device which is an ink jet printer utilizing heat-generating element as the ejecting energy source of ink (orifice size 40×50 μm, heater size 50×150 μm, the number of nozzles 24, driving voltage 24.5 V, frequency 3 KHz), printing was performed on a commercially available continuous slip paper and copying paper, and fixing characteristic and the extent of feathering of the printed matter obtained were evaluated. In Examples and a part of Comparative examples there was mounted a thermistor having positive characteristics around the ink liquid chamber (trade name: Posistor, Curie point 30°, 40°, 45°, 60°, produced by Murata Seisakusho) to apply temperature elevation operation.

Also, the printing head was left to stand at 25° C. for 24 hours without capping operation, and again printing operation was performed, and the power source of the printer was turned off when three lines of printing were performed, and then the clogging states of the 24 nozzles were observed.

The above results, physical property values of ink at 25° C., elevated temperature during recording and the viscosity of the ink are shown in Table 1.

TABLE 1

| | | Physical property values (25° C.) | | Temperature elevated | | Evaluation of results | | |
|---|---|---|---|---|---|---|---|---|
| | Ink | Viscosity (CP) | Surface tension (dyn/cm) | Temperature (°C.) | Viscosity (CP) | Fixing*1 characteristic | *2 Feathering | *3 Clogging |
| Example | | | | | | | | |
| 1 | A | 2.1 | 67 | 40 | 1.7 | ◉ | ◉ | ◉ |
| 2 | B | 2.0 | 43 | 40 | 1.7 | ◉ | ○ | ○ |
| 3 | C | 2.5 | 59 | 45 | 1.9 | ○ | ◉ | ◉ |
| 4 | D | 4.1 | 42 | 45 | 1.9 | ○ | ○ | ◉ |
| 5 | D | 4.1 | 42 | 60 | 1.6 | ◉ | ◉ | ◉ |
| Comparative Example | | | | | | | | |
| 1 | E | 1.4 | 65 | —*0 | — | ◉ | ◉ | X |
| 2 | F | 2.2 | 36 | —*0 | — | ○ | X | Δ |
| 3 | G | 1.6 | 37 | —*0 | — | ◉ | Δ | X |
| 4 | C | 2.5 | 59 | —*0 | — | X | Δ | ◉ |
| 5 | C | 2.5 | 59 | 30 | 2.3 | Δ | Δ | ◉ |
| 6 | A | 2.1 | 67 | —*0 | — | Δ | ◉ | ◉ |

*0 In each case, the temperature is 25° C.
*1 Fixing characteristic evaluation After 10 seconds and 30 seconds after printing on a continuous slip paper (trade name: Dia 64Gr, produced by Mitsubishi Paper Mills, Ltd.) and copying paper (trade name: 9-50015HI, produced by Hammermill), the printed portion was rubbed with a filter paper (trade name: No. 5C, produced by Toyo Kagaku Sangyo K.K.) (evaluated under the environmental conditions of 25° C., 60% RH).◉ . . . no scratch after 10 seconds ○ . . . small scratch after 10 seconds Δ . . . small scratch after 30 seconds x . . . great scratch after 30 seconds
*2 Measurement of feathering After printing 300 dots on the continuous slip paper as described above so that the dots were not continuous to one another, the printed matter was left to stand for one hour or longer and thereafter the number of dots having generated feathering was counted by a microscope and feathering was represented in terms of % (printed under the environmental conditions of 25° C., 60% RH)◉: 10% or less ○: 11 to 20% Δ: 21 to 30% x: 31% or higher
3* Clogging evaluation This was evaluated in terms of the number of the nozzles suffered from clogging among 24 nozzles (evaluated under the environmental conditions of 25° C., 30% RH)◉: 0 ○: 1 or 2 Δ: 3 to 5 x: 6 or more

Examples 6–7

By use of the ink D and the ink jet printer (BJ-80, produced by Canon K. K.), solid printing was performed at 40° C., 60° C. on a commercially available coated paper for ink jet recording (Matcoat NM, produced by Mitsubishi Seishi) by use of a thermistor of positive characteristic (trade name: Posistar, Curie point 40°, 60°), and the optical density (O.D.) of the printed matter obtained was evaluated. The evaluation results are shown in Table 2.

Comparative examples 7–10

By use of the ink D, and the inks H, I, J prepared by increasing the dye concentration in the ink D to 7%, 9% and 11%, solid printing was performed on the coated paper for ink jet recording as described above at 25°, and the optical density (O.D.) of the printed matter obtained was evaluated.

Also, clogging evaluation was conducted similarly as in Example 1 for the inks D and H–J.

The evaluation results are shown on Table 2.

TABLE 2

| | Ink | Dye Concentration (%) | Temperature upon printing (°C.) | *4 O.D. | Clogging |
|---|---|---|---|---|---|
| Example | | | | | |
| 6 | D | 5 | 40 | 1.67 | ◉ |
| 7 | D | 5 | 60 | 1.72 | ◉ |
| Comparative Example | | | | | |
| 7 | D | 5 | —*5 | 1.52 | ◉ |
| 8 | H | 7 | —*5 | 1.61 | Δ |
| 9 | I | 9 | —*5 | 1.69 | X |
| 10 | J | 11 | —*5 | 1.73 | X |

*4 Measurement of O.D. The optical density was measured by use of an optical densiometer (trade name, Macbeth RD 918, produced by Macbeth). The value shown is the average of three measured values obtained by measuring three times the same sample.
*5 In each case, the temperature is 25° C.

According to the ink jet recording method of the present invention, highly reliable recording with good fixing characteristic, printed letter quality and further without generation of nozzle clogging has been rendered possible not only on a designated paper specially prepared for ink jet recording as a matter of course, but also on other normal papers which are subjected to sizing and have fibers exposed on the surface to be recorded, typically copying paper, report paper, bond paper, continuous slip paper, etc.

Further, since no strongly basic substance, etc., is used in the ink, an ink jet recording method which is also highly safe can be realized.

We claim:

1. An ink jet recording method which performs recording by attaching liquid droplets of a recording liquid onto a recording medium, comprising the steps of:

providing an ink jet recording device having a liquid flow path leading to ejection means;

selecting as said recording liquid a recording liquid having a viscosity of 2 centipoise or higher and a surface tension of 40 dyne/cm or higher, each being measured at 25° C., and said recording liquid containing 50 wt. % or more water and at least one water-soluble organic solvent selected from the group consisting of glycerin, diethylene glycol, triethylene glycol, triethylene glycol monomethyl ether, triethylene glycol monoethyl ether and polyethylene glycol;

heating said recording liquid so as to reduce the viscosity thereof to below 2 centipoise; and thereafter introducing the heated recording liquid having a viscosity of less than 2 centipoise into said liquid flow path upstream of said ejection means.

2. An ink jet recording method according to claim 1, wherein the recording medium surface is sized and has fibers exposed thereon.

3. An ink jet recording method according to claim 1, wherein said recording liquid comprises a water-soluble dye, a water-soluble organic solvent and water as main components.

4. An ink jet recording method according to claim 3, wherein the content of said dye is in the range of from 0.5 to 30 wt. %.

5. An ink jet recording method according to claim 3, wherein the content of said organic solvent is in the range of from 2 to less than 50 wt. %.

6. An ink jet recording method according to claim 1, wherein the content of water in said recording liquid is 60 wt. % or more.

7. An ink jet recording method according to claim 1, wherein the content of water in said recording liquid is 70 wt. % or more.

8. An ink jet recording method according to claim 1, wherein the recording liquid is maintained at such a temperature that its viscosity becomes 1.8 centipoise or less.

9. An ink jet recording method according to claim 1, wherein the recording liquid is maintained at the range of from 30° to 80° C.

10. An ink jet recording method according to claim 1, wherein the recording liquid has a viscosity of 15 centipoise or less at 25° C.

11. An ink jet recording method according to claim 1, wherein the recording liquid has a viscosity of 10 centipoise or less at 25° C.

12. An ink jet recording method according to claim 1, wherein the recording liquid has a viscosity of 5 centipoise or less at 25° C.

13. An ink jet recording method which performs recording by imparting heat energy in response to recording signals to a recording liquid to form liquid droplets thereof, and attaching the liquid droplets onto a recording medium, comprising the steps of:

providing an ink jet recording device having a liquid flow path leading to ejection means;

selecting as said recording liquid a recording liquid having a viscosity of 2 centipoise or higher and a surface tension of 40 dyne/cm or higher, each being measured at 25° C., and said recording liquid containing 50 wt. % or more of water, and at least one water-soluble organic solvent selected from the group consisting of glycerin, diethylene glycol, triethylene glycol, triethylene glycol monomethyl ether, triethylene glycol monoethyl ether, and polyethylene glycol;

heating said recording liquid so as to reduce the viscosity thereof to below 2 centipoise; and thereafter introducing the heated recording liquid having a viscosity of less than 2 centipoise into said liquid flow path upstream of said ejection means.

14. An ink jet recording method according to claim 13, wherein said recording medium is coated paper.

15. An ink jet recording method according to claim 13, wherein said recording liquid comprises a water-soluble dye, a water-soluble organic solvent and water as main components.

16. An ink jet recording method according to claim 15, wherein the content of said dye is in the range of from 0.5 to 30 wt. %.

17. An ink jet recording method according to claim 15, wherein the content of said organic solvent is in the range of from 2 to less than 50 wt. %.

18. An ink jet recording method according to claim 13, wherein the recording liquid is maintained at such a temperature that its viscosity becomes 1.8 centipoise or less.

19. An ink jet recording method according to claim 13, wherein the recording liquid is maintained at the range of from 30° to 80° C.

20. An ink jet recording method according to claim 13, wherein the recording liquid has a viscosity of 15 centipoise or less at 25° C.

21. An ink jet recording method according to claim 13, wherein the recording liquid has a viscosity of 10 centipoise or less at 25° C.

22. An ink jet recording method according to claim 13, wherein the recording liquid has a viscosity of 5 centipoise or less at 25° C.

23. An ink jet recording method according to claim 1, wherein said recording medium is coated paper.

* * * * *

UNITED STATES PATENT AND TRADEMARK OFFICE
CERTIFICATE OF CORRECTION

PATENT NO. : 4,965,609

DATED : October 23, 1990

INVENTOR(S) : Yasuko Tomida et al.

It is certified that error appears in the above-identified patent and that said Letters Patent is hereby corrected as shown below:

COLUMN 1:

Line 22, "so" should be deleted.

Line 23, "method" should read --methods--, and "and" should be deleted.

COLUMN 2:

Line 5, "and" should read --and,--.

Line 6, "course" should read --course,--.

Line 11, "8 cps" should read --8 cst--.

Line 16, "ensue" should read --ensue,--.

Line 18, "solvents" should read --solvent--.

Line 27, "the dye with" should read --with the dye--.

Line 48, "the" should read --a-- (both occurrences).

UNITED STATES PATENT AND TRADEMARK OFFICE
CERTIFICATE OF CORRECTION

PATENT NO. : 4,965,609
DATED : October 23, 1990
INVENTOR(S) : Yasuko Tomida et al.

It is certified that error appears in the above-identified patent and that said Letters Patent is hereby corrected as shown below:

<u>COLUMN 3</u>:

Line 9, "invention" should read --inventors--.

Line 36, after "used" insert --in--.

Line 37, "those" (first occurrence) should be deleted.

<u>COLUMN 4</u>:

Line 23, "changes" (first occurrence) should be deleted and "occur not" should read --occur are not--.

<u>COLUMN 5</u>:

Line 11, "specific" should read --only specific--.

Line 17, "system" should read --systems--.

Line 21, "preferably" should read --preferable--.

<u>COLUMN 7</u>:

Line 8, "to" should be deleted.

UNITED STATES PATENT AND TRADEMARK OFFICE
CERTIFICATE OF CORRECTION

PATENT NO. : 4,965,609            Page  3  of  3

DATED : October 23, 1990

INVENTOR(S) : Yasuko Tomida et al.

It is certified that error appears in the above-identified patent and that said Letters Patent is hereby corrected as shown below:

Line 9, "systems," should read --systems-- and "a" should read --the--.

Line 10, "the" should read --a--.

Line 26, "in" should be deleted.

Line 43, "extremely" should read --extremely safe--.

COLUMN 8:

Line 27, "Triethylene glycol  2 parts" should read --Triethylene glycol  25 parts--.

COLUMN 9:

Line 61, "on" should read --in--.

Signed and Sealed this

Twenty-first Day of July, 1992

*Attest:*

DOUGLAS B. COMER

*Attesting Officer*      *Acting Commissioner of Patents and Trademarks*